Nov. 1, 1927.
E. N. HUMPHREY
1,647,800
BRACE FOR AGITATOR BLADES OF EGG BEATERS
Filed May 6, 1926     3 Sheets-Sheet 1
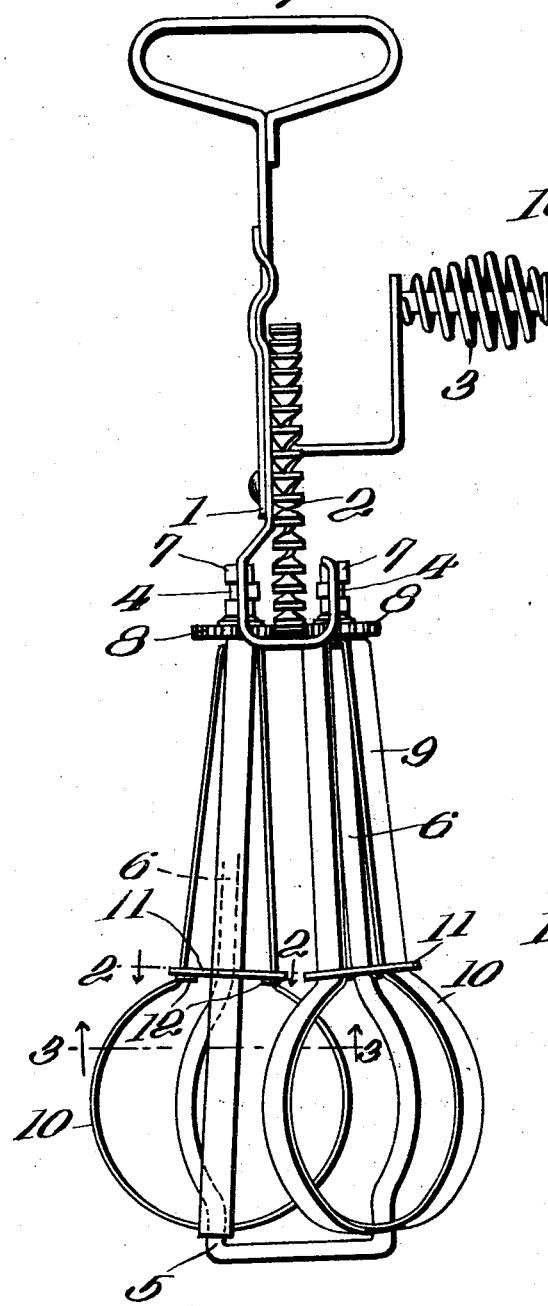
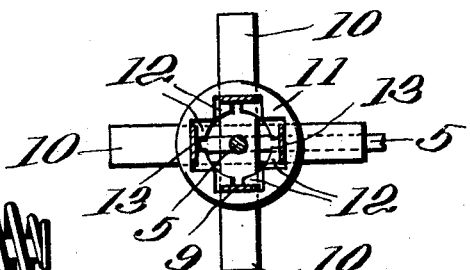
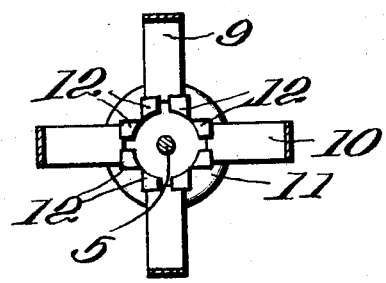
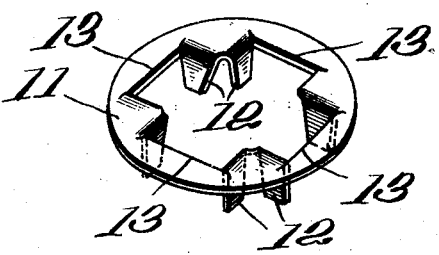
Inventor
Ernest N. Humphrey,
A. S. Pattison Son
By
Attorneys Nov. 1, 1927.  
E. N. HUMPHREY  
1,647,800  
BRACE FOR AGITATOR BLADES OF EGG BEATERS  
Filed May 6, 1926   3 Sheets-Sheet 2
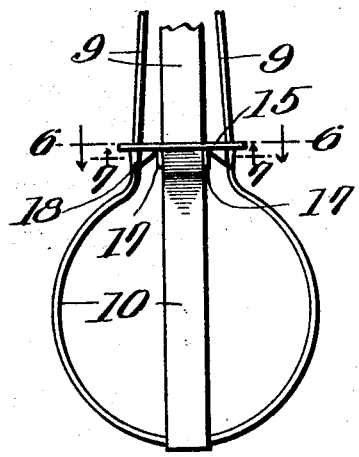
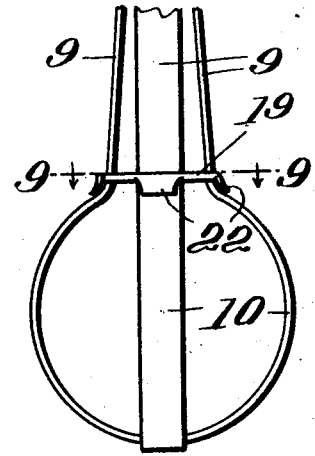
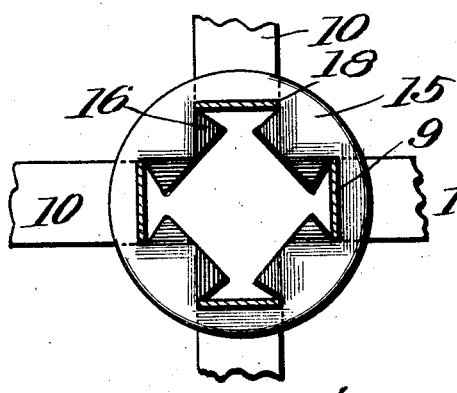
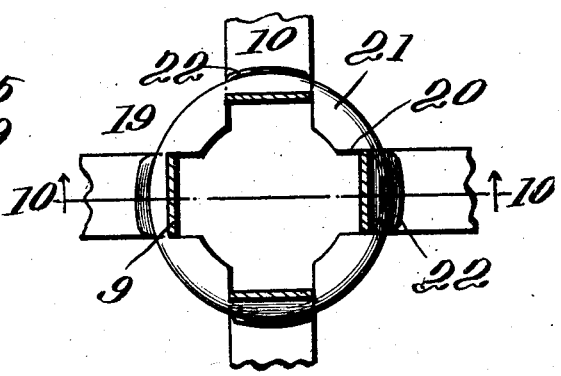
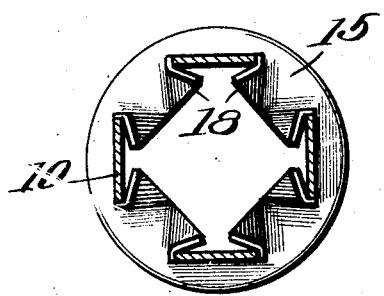
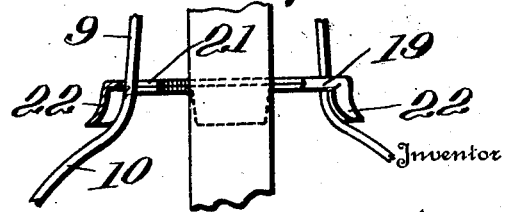

Nov. 1, 1927.
E. N. HUMPHREY
BRACE FOR AGITATOR BLADES OF EGG BEATERS
Filed May 6, 1926
1,647,800
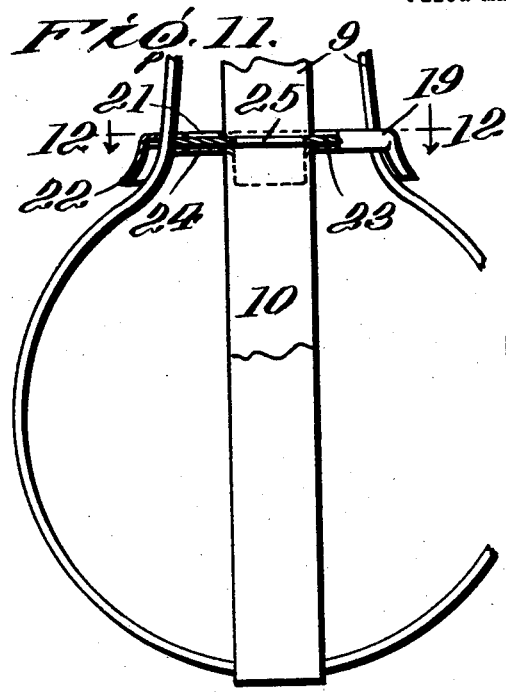
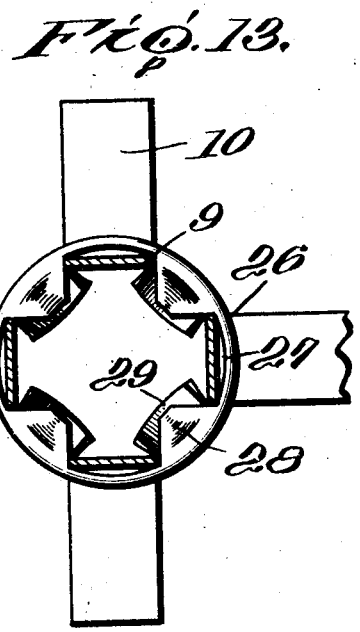
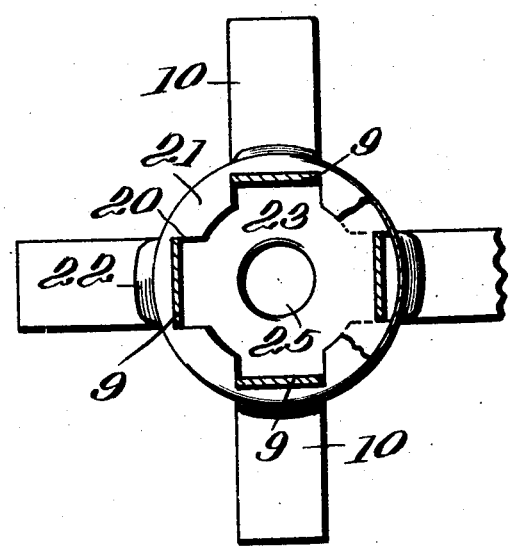
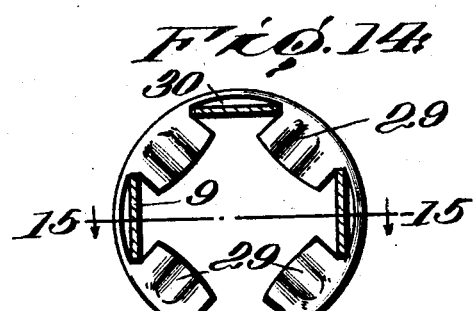
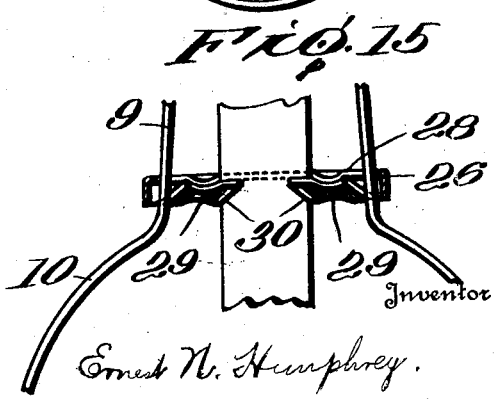
Inventor
Ernest N. Humphrey.
By A. S. Pattison Jr.
Attorney Patented Nov. 1, 1927.

1,647,800

UNITED STATES PATENT OFFICE.

ERNEST N. HUMPHREY, OF NEW BRITAIN, CONNECTICUT, ASSIGNOR TO UNITED ROYALTIES CORPORATION, OF NEW YORK, N. Y., A CORPORATION OF NEW YORK.

BRACE FOR AGITATOR BLADES OF EGG BEATERS.

Application filed May 6, 1926. Serial No. 107,217.

This invention relates to certain improvements in braces for agitator blades of egg beaters, and the primary object of this improvement is to apply a brace to the agitator blades whereby they are prevented from being bent out of shape inwardly or outwardly, or displaced sidewise, in shipping or handling them.

It has been found in the manufacture of agitator blades that are not provided with suitable braces, that the blades are either bent inwardly, or pulled outwardly or displaced sidewise in shipping or in handling them, whereby the operation of the beater is interfered with, and at times entirely prevented.

A further object of the present invention is to make a brace that is constructed to be applied to agitator blades substantially at the juntcion of the straight and the laterally bulged portions of the blades, the brace being so constructed that it will hold the several blades rigidly and prevent them from being bent out of shape as stated, thus interfering with the operation of the beater, or entirely preventing its operation.

In the accompanying drawings:

Figure 1 is a side elevation of an egg beater showing my improved brace applied to the agitator arms thereof and acting to hold them rigidly in their original shape.

Figure 2 is a sectional view on the line 2—2, looking in the direction indicated by arrows, showing the brace in position on the agitator blades.

Figure 3 is a sectional view on the line 3—3, looking at the under side of the brace, showing its arms in locked engagement with the agitator blades.

Figure 4 is a detached top perspective view of this brace, before it is applied to the agitator blades.

Figure 5 is a view in side elevation of a modified form of brace for locking the agitator blades.

Figure 6 is a sectional view on the line 6—6 of Figure 5, looking in the direction indicated by the arrow.

Figure 7 is a sectional view on the line 7—7 of Figure 5, looking at the under side of the brace.

Figure 8 is a view in side elevation of a further modified form of brace for locking the agitator blades.

Figure 9 is a sectional view on the line 9—9 of Figure 10, looking in the direction indicated by the arrow.

Figure 10 is a vertical sectional view on the line 10—10 of Figure 9, a portion of the view being shown in full line.

Figure 11 is a still further modified form of brace for locking the agitator blades.

Figure 12 is a sectional view on line 12—12 of Figure 11.

Figure 13 is a sectional view looking at the top of a still further modified form of brace for locking the agitator blades.

Figure 14 is a sectional view looking at the bottom of the brace shown in Figure 13.

Figure 15 is a transverse vertical sectional view taken on the line 15—15 of Figure 14.

Referring to the accompanying drawings, Figure 1, in which a form of beater is shown, the same consisting of a suitable framework 1, to which a gear-wheel 2 is journaled, the said gear-wheel carrying a handle 3, by means of which it is rotated. In the form here shown, the lower end of the frame 1 is bent into substantially a U-shape 4, the parallel arms of the U-shape adapted to receive a suitable rod 5, that is also substantially U-shaped in elevation, the said rod having its upper ends suitably connected with the parallel arms 4, of the U-shaped part of the frame 1. This rod has the upper ends of its substantially parallel arms 6 suitably connected as at 7, to the parallel arms of the U-shaped portion of the frame 1. Suitable pinions 8 are connected to the upper ends of the said portions 9 of the agitator blades, and these rods pass loosely through the centers of the pinions. The pinions are located on the opposite sides of the wheel 2, whereby the rotation of the wheel revolves the agitator blades in opposite directions, and the lower outwardly bent portions 10 of the agitator blades as they are rotated, one portion 10 passing between similar portions 10 of the other agitators. Thus far I have explained an ordinary egg beater to which my present improvement is applied.

By reference to Figure 4, the detailed construction of the improved brace is shown. It consists of a ring-like flat member 11, which is cut out at its center and has downwardly bent arms 12, located at the corners of the cut-out portion. It will be observed from this view of the present improvement, that the cut-out portion is substantially cross-shaped.

This member 11 is applied to the beater blades before the pinions 8 are attached to them, which is, of course, prior to the assembling of the blades on the structure. The form of agitator blade here shown comprises four blades made up of the straight portion 4, and the outwardly bent portions 10. Consequently, the brace member 11 has the four cut-out portions 13 that form the said cross-shaped opening, and this member is slid down over the straight portions 9 of the blades until it reaches substantially the junction of the bent portions 10 with the straight portions 9. In this position the arms 12 are extending downwardly and they are bent around and under the blades and are made to grasp the said blades tightly, thereby forming substantially a rigid brace for the blades.

It will be understood that the brace being applied to the blades as stated, they cannot be bent out of position in shipping, to make the beater difficult to work, or thrown entirely out of operation.

The agitator blades with this brace applied to it, as described, will stand a greater strain than the beater is ever subjected to in shipping or in use.

Without this brace the outwardly bent portions 10 are liable to be crushed so as to bring two of them very close together, thus interfering with the blades of the corresponding agitator freely passing between the abnormally bent blades, thus making the machine very poor, or if sufficiently bent out of its normal form, will prevent it from working at all. Again, the bending of the bent portions 10 outwardly, thus expanding the agitator, will pull the pinion downward and throw it out of mesh with the gear wheel 2, which it will be understood will prevent the machine from operating at all.

Heretofore when the agitator blades have been bent sufficiently out of their normal shape to cause the machine to work with difficulty, or not to work at all, the machines become a cull and are thrown to one side, either becoming a loss to the merchant, or are returned to the manufacturer. With the brace herein described, the egg beater is prevented from becoming a cull. It will also be understood that the said brace makes the blades sufficiently rigid so that the operation of the machine at all times can be relied upon and it will not be necessary to either throw the beater away or to return it to the manufacturer.

Machines of this character are not expensive and when one of them becomes unsatisfactory in operation, by reason of the bending of the agitator blades, the sale of it is certainly hurt in the mind of the merchant handling it or in the mind of a prospective purchaser. That is to say, a merchant would not agree to fool with the machines that are so liable to be discarded as to make their operation unsatisfactory, or their operation impossible, hence, the desirability of making a beater of a rigid character that will not be subjected to the above defects is highly desirable to the trade and to the public generally who have use for the device.

Referring to Figures 5 to 7 inclusive, I have shown a modified form of brace which in construction is similar to the brace heretofore described.

It will be seen that in this form the brace comprises a ring-like flat member 15 having a centrally cut-out portion and is provided further with downwardly and inwardly bent arms or ears 16. As clearly appears in Figure 5, these arms for a portion of their length parallel the beater blades 9 as appears at 17, while the other portion of the arms is bent laterally over or in back of the blades 9 as appears at 18, and holds the blades firmly in place against the inner edge of the ring.

In this form the brace is positioned slightly above the bulged or bent portions 10 of the agitator blades as clearly appears at 18.

Referring to Figures 8 to 10 inclusive, I have illustrated a still further modified form of brace.

The brace in this instance is a ring-like member 19 which fits over the agitator blade arms 9. This ring is provided at its four sides with cut-out portions 20 to receive the arms 9 and intermediate these cut-out portions are provided with inwardly extending arms or ears 21, which as clearly appears in Figure 10 of the drawings, are of double thickness of material. Extending downward from the outer edge of the ring opposite the cut-out portions 20 are ears or arms 22 which parallel the agitator blades 10, as clearly appears in Figures 8 to 10 of the drawings.

These arms 22 are of a single thickness of material as one thickness of material has been cut away to form the cut-out portions 20.

The blade arms 9 will seat themselves in the cut-out portions 20 due to the resiliency which they have, which causes them to move outwardly.

Referring to Figures 11 and 12, there is shown a still further modified form of brace for the agitator blades.

This form of brace is very similar to that appearing in Figures 8 to 10 inclusive, and comprises the same ring-like member 19, the same inwardly extending ring portions 21 and downwardly extending ears or arms 22, as well as the cut-out portions 20 for receiving the agitator blade arms 9.

This form of brace, however, has an additional flat disk 23 which is held in position between the double thickness of material of the ring at the inwardly extending portions 21, as clearly appears at 24 in Figure 11 of the drawings. The plate or disk 23 is provided centrally with an opening 25 to permit the passage of the rod 6.

With this form of brace it will be readily apparent that the agitator blades are absolutely locked in their respective positions. They cannot move laterally due to the inwardly extending portions 21, they cannot move outwardly due to the ring 19 and they cannot move inwardly due to the disk or plate 23.

Referring to Figures 13 to 15 inclusive, there appears a still further modified form of agitator blade brace.

The brace in this instance is a ring-like member 26 provided at four sides with cut-out portions 27 adapted to receive the blade arms 9. Intermediate the cut-out portions there are two arms 28 and 29. The arms 28 extend inwardly in a horizontal plane whereas the arms 29 are bent inwardly and upwardly to assume the angular position clearly appearing in this figure of the drawing so that the edges of these arms engage the inner side of the agitator blades as clearly appears at 30, and lock the blades firmly in the cut-out portions 27.

With a construction of this character it will be seen that the blades are locked against both inward and outward movement as well as against any lateral displacement.

In respect to the modified form of braces, no complete showing of a beater has been made as these braces are applied to the agitator blades in much the same manner as described in respect to the first form of brace.

I desire to state that the present improvements may be varied in construction so long as the varied construction comes within a fair interpretation of the appended claims.

Having thus described my invention, what I claim and desire to secure by Letters Patent is:

1. An agitator composed of a plurality of blades with outwardly bent lower portions, of a brace having cut-out portions to receive the said blades, the cut out portions having arms adapted to be bent in engagement with the blades to lock them in their original position.

2. A brace for beater agitators, comprising an annular sheet cut out to form laterally extending portions to receive beater blades, and the walls of the cut-out portions having arms adapted to be bent in engagement with the said blades, for the purpose described.

3. A beater composed of several blades, a brace applied to the blades intermediate their ends, said brace comprising a flat circular member with cut-out portions to receive the blades, arms adjacent said cut-out portions, and said arms adapted to be bent upwardly to assume positions in a parallel plane to the brace and below the same, whereby the said arms engage the blades and lock them in the cut-out portions.

4. A beater composed of several blades, a brace applied to said blades intermediate their ends, said brace comprising a flat circular member with downwardly extending arms at the opposite edges of said cut-out portions, and said arms adapted to be bent upwardly towards one another, whereby the edges of said arms engage the blades and lock them in the cut-out portions.

5. A beater composed of several blades, a brace for said blades applied to the blades intermediate their ends, said brace comprising a substantially circular flat metallic disk having cut-out portions provided with downwardly extending arms at their opposite sides, and said arms adapted to be bent towards one another in a substantially vertical plane, where a portion of the face of the arms engages the blades and locks them in the cut-out portions.

6. A beater composed of a plurality of blades, a brace applied to said blades intermediate their ends, said brace comprising a substantially flat circular disk having cut-out portions adapted to receive the blades, said cut-out portions provided at their opposite sides with downwardly extending arms, and said arms adapted to be twisted towards one another in a substantially vertical plane, whereby the outer edges of the arms are in substantially the same plane as the outer edges of the blades and a portion of the arm engaging the inner face of the blades for locking them in the cut-out portions.

7. A beater comprising a plurality of blades, a brace applied to said blades intermediate their ends, said brace comprising a ring having cut-out portions adapted to receive the blades, inwardly extending arms intermediate the cut-out portions and forming side walls for locking the blades against lateral movement, downwardly extending arms at the outer edge of said cut-out portions for engaging the outer faces of the blades.

8. A beater composed of several blades, a brace applied to said blades intermediate their ends, said brace comprising a ring having cut-out portions to receive the blades, said ring provided with inwardly extending portions intermediate the cut-out portions and adapted to engage the edges of the blades, said portions being composed of a double thickness of material, and downwardly extending arms at the outer edge of said cut-out portions and adapted to engage the outer face of the blades.

9. A beater composed of several blades, a brace applied to said blades intermediate their ends, said brace comprising a ring having cut-out portions adapted to receive the blades, said ring having inwardly extending portions intermediate the cut-out portions and composed of a double thickness of material, said inwardly extending portions adapted to engage the edges of the blades, and a flat disk centrally disposed within said ring and held in position by being clamped between the double thickness of the inwardly extending ring portions intermediate the blades.

10. A beater composed of several blades, a brace applied to the blades intermediate their ends, said brace comprising a ring having cut-out portions to receive said blades, inwardly extending portions intermediate said cut-out portions and composed of a double thickness of material, said inwardly extending portions adapted to engage the edges of the blades, a flat disk carried within said ring and being clamped in position between the double thickness of material of the said inwardy extending ring portions, and downwardly extending arms positioned at the outer edges of said cut-out portions and adapted to engage the outer faces of the blade, whereby said blades are locked against displacement of said cut-out portions.

11. A beater comprising several blades, a brace applied to said blades intermediate their ends, said brace comprising a ring having cut-out portions adapted to receive the blades, inwardly extending arms intermediate said cut-out portions and forming side walls to the same, and downwardly extending arms intermediate said cut-out portions and adapted to be bent inwardly and upwardly to engage the inner edges of said blades and lock the same securely in said cut-out portions.

12. A beater comprising several blades, a brace applied to said blades intermediate their ends, said brace comprising a circular member having a central portion, a plurality of cut-out portions of a width equal to the width of the blades, inwardly extending flat portions intermediate the said cut-out portions and forming side walls for said cut-out portions, and downwardly extending arms carried by said brace and adapted to be bent to engage the blades for locking them in said cut-out portions.

13. A beater composed of several blades, a brace adapted to pass over the upper part of the blades, said brace made of a single plate having cut-out portions in the form of a cross, and said cut-out portions adapted to receive said blades, and lock them against displacement and distortion.

14. A beater composed of several blades, a brace plate having cut out portions substantially in the form of a cross, the wall of the cut out portion adapted to be bent in engagement with the said blades for locking them against displacement and distortion.

In testimony whereof I hereunto affix my signature.

ERNEST N. HUMPHREY.